(12) United States Patent  
Nakamura et al.

(10) Patent No.: US 12,119,492 B2  
(45) Date of Patent: Oct. 15, 2024

(54) POSITIVE ELECTRODE ACTIVE MATERIAL FOR ALL-SOLID-STATE LITHIUM ION SECONDARY BATTERY AND METHOD FOR MANUFACTURING THE SAME

(71) Applicant: SUMITOMO METAL MINING CO., LTD., Tokyo (JP)

(72) Inventors: Hitomi Nakamura, Niihama (JP); Ryosuke Okamoto, Niihama (JP); Kazuhide Hayashi, Niihama (JP); Mikako Toma, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 18/018,166

(22) PCT Filed: Jul. 29, 2021

(86) PCT No.: PCT/JP2021/028186  
§ 371 (c)(1),  
(2) Date: Jan. 26, 2023

(87) PCT Pub. No.: WO2022/025212  
PCT Pub. Date: Feb. 3, 2022

(65) Prior Publication Data  
US 2023/0268500 A1 Aug. 24, 2023

(30) Foreign Application Priority Data  
Jul. 30, 2020 (JP) ................................ 2020-129024

(51) Int. Cl.  
*H01B 1/08* (2006.01)  
*C01G 53/00* (2006.01)  
*H01M 4/525* (2010.01)

(52) U.S. Cl.  
CPC ............. *H01M 4/525* (2013.01); *C01G 53/42* (2013.01); *H01B 1/08* (2013.01); *C01P 2002/72* (2013.01);  
(Continued)

(58) Field of Classification Search  
CPC .. H01B 1/00; H01B 1/08; H01M 4/36; H01M 4/505; H01M 4/525; C01G 53/42  
See application file for complete search history.

(56) References Cited

U.S. PATENT DOCUMENTS 9,981,859 B2    5/2018  Shimokita et al.  
10,153,489 B2 * 12/2018  Kawasato ............. H01M 4/505  
(Continued)

FOREIGN PATENT DOCUMENTS

JP    2010-170715 A    8/2010  
JP    2011-116580 A    6/2011  
(Continued)

OTHER PUBLICATIONS

International Search Report dated Oct. 12, 2021, issued in counterpart Application No. PCT/JP2021/028186, with English Translation. (4 pages).

(Continued)

*Primary Examiner* — Mark Kopec  
(74) *Attorney, Agent, or Firm* — WHDA, LLP

(57) ABSTRACT

A positive electrode active material for an all-solid-state lithium ion secondary battery includes a lithium-nickel composite oxide particle and a coating layer coating a surface of the particle. The lithium-nickel composite oxide particle has a crystal structure belonging to a space group R-3m, contains at least Li, Ni, an element M, and Nb, a molar ratio among the elements being represented by Li:Ni:M:Nb=a:(1-x-y):x:y (0.98≤a≤1.15, 0<x≤0.5, 0<y≤0.03, 0<x+y≤0.5, and the element M, has a crystallite diameter of (Continued)

140 nm or less, and has an eluted lithium ion amount of 0.30% by mass or more and 1.00% by mass or less. The coating layer is a composite oxide containing Li and at least one element.

8 Claims, 4 Drawing Sheets

(52) U.S. Cl.
CPC ...... *C01P 2004/61* (2013.01); *C01P 2006/12* (2013.01); *C01P 2006/40* (2013.01)

(56) References Cited

U.S. PATENT DOCUMENTS

| | | |
|---|---|---|
| 2012/0270107 A1 | 10/2012 | Toya et al. |
| 2015/0214572 A1 | 7/2015 | Kato et al. |
| 2016/0099460 A1 | 4/2016 | Toyama et al. |
| 2016/0293952 A1 | 10/2016 | Kaneda et al. |
| 2019/0312279 A1 | 10/2019 | Otsuka et al. |
| 2023/0187624 A1* | 6/2023 | Koshika ................ H01M 4/131 429/223 |

FOREIGN PATENT DOCUMENTS

| | | |
|---|---|---|
| JP | 2014-056661 A | 3/2014 |
| JP | 2015-122298 A | 7/2015 |
| JP | 2016-076470 A | 5/2016 |
| JP | 6536658 B2 | 7/2019 |
| JP | 2019-139854 A | 8/2019 |
| JP | 2020-087822 A | 6/2020 |
| JP | 2020-100541 A | 7/2020 |
| JP | 2020-167136 A | 10/2020 |
| KR | 20180071714 A | 6/2018 |

OTHER PUBLICATIONS

International Preliminary Report on Patentability (Form PCT/IB/373) issued in counterpart International Application No. PCT/JP2021/028186 dated Jan. 31, 2023, with Form PCT/ISA/237. (10 pages).

Ohata, Narumi et al., "LiNbO3-coated LiCoO2 as cathode material for all solid-state lithium secondary batteries", Electrochemistry Communications, vol. 9, (2007), pp. 1486-1490; Cited in the specification.

Extended (supplementary) European Search Report dated Aug. 16, 2024, issued in counterpart EP Appliction No. 21851567.4. (5 pages).

* cited by examiner

POSITIVE ELECTRODE ACTIVE MATERIAL FOR ALL-SOLID-STATE LITHIUM ION SECONDARY BATTERY AND METHOD FOR MANUFACTURING THE SAME

TECHNICAL FIELD

The present invention relates to a positive electrode active material for an all-solid-state lithium ion secondary battery and a method for manufacturing the positive electrode active material.

BACKGROUND ART

In recent years, with an increase in awareness of environmental issues, a shift from a gasoline car to a hybrid car and an electric car has progressed. In particular, development of a small and lightweight secondary battery having high energy, which is indispensable for widespread use of an electric car, is strongly desired. There is a lithium ion secondary battery as such a secondary battery.

Currently, a general lithium ion secondary battery uses a lithium-transition metal composite oxide such as $LiCoO_2$, $LiNiO_2$, or $LiMn_2O_4$ as a positive electrode active material, and uses a lithium metal, a lithium alloy, a metal oxide, carbon, or the like as a negative electrode active material. When a non-aqueous electrolyte solution is used as an electrolyte, for example, an electrolyte solution obtained by dissolving a Li salt such as $LiClO_4$ or $LiPF_6$ as a supporting salt in an organic solvent such as ethylene carbonate, dimethyl carbonate, or ethyl methyl carbonate is used.

Among components of the lithium ion secondary battery, in particular, a non-aqueous electrolyte solution is a factor that limits battery performance such as high-speed charging, thermal stability, or life due to chemical characteristics such as heat resistance and potential window. Therefore, currently, research and development are actively performed on an all-solid-state lithium ion secondary battery (hereinafter, also referred to as "all-solid-state battery") in which the above battery performance is improved by using a solid electrolyte instead of the non-aqueous electrolyte solution.

For example, Patent Literature 1 describes that among solid electrolytes, a sulfide solid electrolyte has high lithium ion conductivity during charge and discharge and suitable for use in an all-solid-state battery. However, for example, as disclosed in Non Patent Literature 1, when the sulfide solid electrolyte and a positive electrode active material, which is an oxide, come into contact with each other, a reaction occurs at an interface between the solid electrolyte and the positive electrode active material during charge and discharge, and a high resistance phase is generated at the interface to inhibit operation of the all-solid-state battery. This is because a space charge layer is formed due to a change in conductive ion concentration due to a difference in electrochemical potential at the contact interface. An ionic conductivity different from that of a bulk is obtained, and a resistance increases.

Therefore, for example, Patent Literature 2 proposes a technique of forming a coating layer made of $LiNbO_3$ on a surface of a positive electrode active material (oxide) in order to prevent contact between a solid electrolyte and the positive electrode active material to suppress generation of a high resistance phase.

CITATION LIST

Patent Literature

Patent Literature 1: JP 2014-056661 A
Patent Literature 2: JP 2010-170715 A
Patent Literature 3: JP 2011-116580 A

Non Patent Literature

Non Patent Literature 1: Narumi Ohta et al., "$LiNbO_3$-coated $LiCoO_2$ as cathode material for all solid-state lithium secondary batteries", Electrochemistry Communications 9 (2007) 1486-1490

SUMMARY OF INVENTION

Technical Problem

Incidentally, in order to increase an energy density of a lithium ion secondary battery, it is preferable to use a positive electrode active material having a high Ni ratio, such as $LiNiO_2$, $LiNi_{0.80}Co_{0.15}Al_{0.05}O_2$, or $LiNi_{0.6}Co_{0.2}Mn_{0.2}O_2$, which has a high charge and discharge capacity. Therefore, the inventors studied applicability of a positive electrode active material having a high Ni ratio to an all-solid-state lithium ion secondary battery. As a result, the present inventors have found that in a case of using a solid electrolyte, it is possible to design a battery in which cells are connected in series, and thus an energy density obtained from a positive electrode active material having a high Ni ratio does not reach an expected energy density or battery capacity although an energy density in the entire battery is improved as compared with a case of using a non-aqueous electrolyte solution.

An object of the present invention is to provide a positive electrode active material having a higher battery capacity when a positive electrode active material having a high Ni ratio is used as a positive electrode active material of an all-solid-state battery in view of the above problems.

Solution to Problem

A first aspect of the present invention provides a positive electrode active material for an all-solid-state lithium ion secondary battery, including a lithium-nickel composite oxide particle and a coating layer coating a surface of the particle, in which the lithium-nickel composite oxide particle has a crystal structure belonging to a space group R-3m, contains at least Li, Ni, an element M, and Nb, a molar ratio among the elements being represented by Li:Ni:M:Nb=a: (1-x-y):x:y ($0.98 \leq a \leq 1.15$, $0 < x \leq 0.5$, $0 < y \leq 0.03$, $0 < x+y \leq 0.5$, and the element M is at least one selected from the group consisting of Co, Al, Mn, Zr, Si, Zn, and Ti), has a crystallite diameter of 140 nm or less as calculated by a Scherrer method from a diffraction peak attributed to a (003) plane measured by XRD, and has an eluted lithium ion amount of 0.30% by mass or more and 1.00% by mass or less with respect to the total amount of the lithium-nickel composite oxide particles as determined by neutralization titration, and the coating layer is a composite oxide containing Li and at least one element selected from the group consisting of Al, Si, Ti, V, Ga, Ge, Zr, Nb, Mo, Ta, and W.

In addition, preferably, the lithium-nickel composite oxide particles include a secondary particle formed by aggregation of a plurality of primary particles, have a porous structure having a plurality of voids in which no primary particle is present in the secondary particle, and have a specific surface area of 0.3 m²/g or more and 2.0 m²/g or less as measured by a nitrogen adsorption BET method. In addition, at least a part of niobium contained in the lithium-nickel composite oxide particles is preferably segregated on an interface between the primary particles. In addition, the lithium-nickel composite oxide particles preferably have a particle size (D50) corresponding to an integrated volume ratio of 50% in an integrated volume distribution curve of particle size distribution of 7 μm or less. In addition, the coating layer preferably has an average thickness of 1 nm or more and 15 nm or less.

A second aspect of the present invention provides a method for manufacturing the above positive electrode active material for an all-solid-state lithium ion secondary battery, the method including: a mixing step of mixing a nickel composite compound, a niobium compound, and a lithium compound to obtain a mixture; a firing step of firing the mixture to obtain lithium-nickel composite oxide particles; and a coating step of attaching a coating liquid containing at least one element selected from the group consisting of Al, Si, Ti, V, Ga, Ge, Zr, Nb, Mo, Ta, and W to surfaces of the lithium-nickel composite oxide particles to form a coating layer.

In addition, the nickel composite compound preferably contains a nickel composite oxide, and the method preferably includes an oxidation roasting step of oxidation-roasting a nickel composite hydroxide adjusted by a crystallization reaction to obtain the nickel composite oxide. In addition, the method preferably includes a heat treatment step of heat-treating the lithium-nickel composite oxide particles having the coating layer formed on surfaces thereof at 300° C. or higher after the coating step.

Advantageous Effects of Invention

When the positive electrode active material of the present invention is used as a positive electrode active material of an all-solid-state battery, a battery capacity is improved. In addition, the manufacturing method of the present invention can manufacture the positive electrode active material with high productivity.

DESCRIPTION OF EMBODIMENTS

Figure 1:
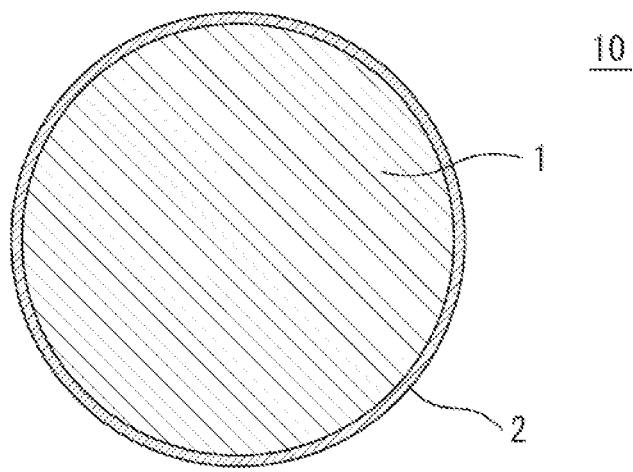
FIG. 1 is a schematic diagram illustrating an example of a positive electrode active material according to the present embodiment.

Hereinafter, an embodiment of the present invention will be described with reference to the drawings. Note that in the drawings, in order to make it easy to understand each component, some parts are emphasized or simplified, and actual structures, shapes, scales, and the like may be different from those of the drawings. In addition, the present invention is not limited to the following embodiment, and various modifications and substitutions can be made to the following embodiment without departing from the scope of the present invention.

1. Positive Electrode Active Material for all-Solid-State Lithium Ion Secondary Battery First, a configuration example of a positive electrode active material for an all-solid-state lithium ion secondary battery (hereinafter, also referred to as "positive electrode active material") according to the present embodiment will be described.

FIG. 1 is a diagram schematically illustrating an example of the positive electrode active material according to the present embodiment. As illustrated in FIG. 1, a positive electrode active material 10 includes a lithium-nickel composite oxide particle 1 and a coating layer 2 coating a surface of the particle 1. Hereinafter, each component will be described.

(1) Lithium-Nickel Composite Oxide Particle

The lithium-nickel composite oxide particle 1 has a crystal structure belonging to a space group R-3m, and is a composite oxide containing at least lithium (Li), nickel (Ni), an element M, and Nb.

(Composition)

When a molar ratio among elements contained in the lithium-nickel composite oxide particle 1 is represented by Li:Ni:M:Nb=a:(1-x-y):x:y, $0.98 \leq a \leq 1.15$, $0 < x \leq 0.5$, $0 < y \leq 0.03$, and $0 < x+y \leq 0.5$ are satisfied. In addition, the above molar ratio preferably satisfies $0.98 \leq a \leq 1.15$, $0 < x \leq 0.3$, $0 < y \leq 0.02$, and $0 < x+y \leq 0.4$.

In the above molar ratio, a indicating a content ratio of Li may satisfy $0.98 \leq a \leq 1.15$, $0.98 \leq a \leq 1.10$, $0.98 \leq a \leq 1.06$, or $0.98 \leq a \leq 1.03$. When a is less than 0.98, Li is deficient in the positive electrode active material, and a capacity as a battery material is likely to decrease. When a is more than 1.15, the crystal structure of the lithium-nickel composite oxide particle 1 excessively grows, the primary particle is coarse, and the particle 1 is easily cracked. Therefore, durability is easily impaired.

(1-x-y) indicating a content ratio of Ni in the above molar ratio is 0.5 or more and less than 1.0. In addition, a range including the lower limit of the content ratio of Ni is preferably 0.6 or more, and may be 0.7 or more or 0.8 or more. The higher the content ratio of (1-x-y), the lower a voltage required for charging, and as a result, the higher a battery capacity. When (1-x-y) is less than 0.5, the battery capacity is low.

In the above molar ratio, the element M is preferably at least one selected from the group consisting of Co, Al, Mn, Zr, Si, Zn, and Ti. In addition, the element M preferably contains at least one element selected from the group consisting of cobalt (Co), aluminum (Al), and manganese (Mn). The element M can be appropriately selected according to an application of a secondary battery formed using the positive electrode active material 10 and required performance.

In the above molar ratio, x indicating a content ratio of the element M satisfies $0 < x \leq 0.5$, preferably satisfies $0 < x \leq 0.3$, and may satisfy $0 < x \leq 0.2$. For example, when the element M contains Co within the above range, the battery has a high battery capacity and excellent cycle characteristics. In addition, the element M may contain Co and Al. As a range of Co, $0 < x \leq 0.3$ or $0 < x \leq 0.2$ may be satisfied. As a range of Al, $0 < x \leq 0.1$ or $0 < x \leq 0.07$ may be satisfied.

In the above molar ratio, y representing a content ratio of Nb satisfies $0 < y \leq 0.03$, and preferably satisfies $0 < y \leq 0.02$. When y is in the above range, the all-solid-state battery can have a high battery capacity. When y is more than 0.03, low activity $LiNb_3O_8$ is generated, which may cause a decrease in battery capacity. In addition, for example, when y satisfies 0.001≤y≤0.01, the all-solid-state battery can have a higher battery capacity.

In addition, niobium contained in the lithium-nickel composite oxide particle 1 may be solid-solved in the primary particle or may be present at an interface between the primary particles. At least a part of niobium is preferably segregated at the interface between the primary particles. Details of a reason for this are not clear, but it is assumed that, for example, niobium is segregated at the interface between the primary particles, thereby reducing a barrier of movement of Li ions in the secondary particle and improving the battery capacity. In addition, it is considered that at least a part of niobium is segregated at the interface between the primary particles, and an eluted lithium amount described later can be thereby easily adjusted within a specific range.

(Crystal Structure)

The lithium-nickel composite oxide particle 1 has a crystal structure belonging to a space group R-3 m. When the lithium-nickel composite oxide particle 1 has a crystal structure belonging to the space group R-3 m, an increase in internal resistance can be suppressed in the secondary battery.

The crystal structure of the lithium-nickel composite oxide particle 1 can be confirmed by powder X-ray diffraction (XRD) measurement. That is, a peak attributed to a layered rock salt type crystal structure of the "R-3m" structure (crystal structure belonging to the space group R-3m) is preferably detected from a diffraction pattern obtained when powder X-ray diffraction (XRD) measurement of the lithium-nickel composite oxide particle 1 is performed. In particular, only a peak attributed to the layered rock salt type crystal structure of the "R-3m" structure is more preferably detected from the above diffraction pattern.

Note that the lithium-nickel composite oxide particle 1 may be formed of a lithium-nickel composite oxide single phase having the crystal structure of the "R-3m" structure, but does not have to be formed of a single phase. When the lithium-nickel composite oxide particle 1 is not formed of a single layer but contains another compound (for example, impurities), preferably, the intensity of a heterophasic peak other than the layered rock salt type structure of the "R-3m" structure does not exceed the peak intensity attributed to the layered rock salt type structure of the "R-3m" structure.

(Crystallite Diameter)

The lithium-nickel composite oxide particle 1 has a crystallite diameter of preferably 140 nm or less, more preferably 40 nm or more and 140 nm or less. A range including the upper limit of the crystallite diameter may be 130 nm or less. A range including the lower limit of the crystallite diameter may be 50 nm or more. Note that the crystallite diameter can be calculated by a Scherrer method using a peak attributed to (003) of the above XRD diffraction pattern. When the crystallite diameter of the lithium-nickel composite oxide particle 1 is more than 140 nm, an in-solid diffusion distance in the crystal may be long, and a battery capacity may decrease. When the crystallite diameter of the lithium-nickel composite oxide particle 1 is less than 40 nm, the crystal structure is unstable, and the battery capacity tends to decrease.

(Eluted Lithium Ion Amount)

In the lithium-nickel composite oxide particles 1, an eluted lithium ion amount determined by neutralization titration is 0.30% by mass or more and 1.00% by mass or less, and preferably 0.30% by mass or more and 0.70% by mass or less with respect to the total amount of the particles 1. Note that the eluted lithium ion amount can be determined by measuring a lithium ion amount eluted into water when the lithium-nickel composite oxide particles 1 are dispersed in water by a neutralization titration method using hydrochloric acid. As the neutralization titration method, a Warder method or a Winkler method can be used.

When the eluted lithium ion amount of the lithium-nickel composite oxide particles 1 is less than 0.30% by mass, the battery capacity may decrease. Details of a reason for this are not clear. However, it is considered that one of the reasons is that, for example, by inclusion of a specific amount of eluted lithium ions on surfaces of the lithium-nickel composite oxide particles 1, direct contact between the lithium-nickel composite oxide particles 1 and the solid electrolyte is suppressed in the all-solid-state battery, and generation of a high resistance phase is suppressed.

Note that when the lithium-nickel composite oxide particle 1 contains niobium, the eluted lithium ion amount increases as compared with that of a lithium-nickel composite oxide not containing niobium. Therefore, for example, by setting the content of niobium within the above range and adjusting the eluted lithium amount to 0.3% by mass or more using a manufacturing method described later, a positive electrode active material having a high discharge capacity can be obtained. Note that when the eluted lithium ion amount of the lithium-nickel composite oxide particles 1 is more than 1.00% by mass, the discharge capacity decreases.

(Crystallite Diameter and Eluted Lithium Ion Amount)

Furthermore, the lithium-nickel composite oxide particle 1 preferably has a crystallite diameter of 140 nm or less and an eluted lithium ion amount of 0.30% by mass or more.

That is, even when the lithium-nickel composite oxide particle 1 has a crystallite diameter of 140 nm or less, the battery capacity may decrease when the eluted lithium ion amount is less than 0.30% by mass. Details of a reason for this are not clear, but for example, it is presumed as follows.

The lithium-nickel composite oxide particles 1 include a secondary particle formed by aggregation of a plurality of primary particles. The crystallite diameter of the lithium-nickel composite oxide particle 1 is positively correlated with the size of the primary particle constituting the secondary particle, and it is considered that there are more particle interfaces between the primary particles as the crystallite diameter is smaller. In addition, the eluted lithium ions are mainly present at a particle interface between the primary particle and the primary particle. Therefore, when the crystallite diameter is small and there are many interfaces between the primary particles, if the eluted lithium ions present at the interface (surface) between the primary particles are excessively reduced, a void is formed at the interface between the primary particles. When a large number of voids are present at the interface between the primary particles, the positive electrode active material is likely to crack in a process of preparing an electrode of the all-solid-state battery, and a contact interface between the lithium-nickel composite oxide particles and the solid electrolyte increases. In addition, a generated phase interferes with transfer of charges between the electrolyte and the positive electrode active material due to a side reaction occurring at the increased contact interface, and therefore it is considered that the resistance of the battery increases and the battery capacity decreases.

Meanwhile, when the crystallite diameter of the lithium-nickel composite oxide particle 1 is more than 140 nm, the battery capacity decreases even when the eluted lithium ion amount is 0.30% by mass or more, which is not preferable.

It is considered that this is because coarsening of the primary particle reduces grain boundaries between the primary particles, therefore the eluted lithium ions are scattered in a lump on a surface of the secondary particle, and presence itself of the eluted lithium ions is a resistance phase. Note that the crystallite diameter and the eluted lithium amount can be adjusted within the above ranges, for example, by using a method for manufacturing a positive electrode active material described later.

(Particle Structure)

The lithium-nickel composite oxide particles 1 include a secondary particle formed by aggregation of a plurality of primary particles. In addition, the lithium-nickel composite oxide particles 1 may contain a single primary particle, and may be a mixture of a single primary particle and a secondary particle.

The secondary particles preferably have an average particle size of 3.0 μm or more and 7.0 μm or less when observed with a scanning electron microscope (SEM), a transmission electron microscope (TEM), or the like. In addition, the secondary particle is preferably formed by aggregation of a large number of primary particles each having a particle size of 0.1 μm or more and 2.0 μm or less. In addition, when the lithium-nickel composite oxide particles 1 contain a single primary particle, the primary particle preferably has a particle size of 1.0 μm or more and 7.0 μm or less. Note that the average particle sizes of the primary particles and the secondary particles can be obtained, for example, by calculating an average of area circle equivalent diameters of 20 or more particles.

(Average Particle Size D50)

The lithium-nickel composite oxide particles 1 have a particle size corresponding to an integrated volume ratio of 50% in an integrated volume distribution curve of particle size distribution (D50, hereinafter also referred to as "average particle size D50) of preferably 7 μm or less, more preferably 2 μm or more and 7 μm or less, still more preferably 3 μm or more and 7 μm or less. Note that the average particle size (D50) can be measured with a laser light diffraction scattering type particle size distribution meter.

When the average particle size D50 of the lithium-nickel composite oxide particles 1 is 7 μm or less, in a secondary battery using the positive electrode active material 10 for a positive electrode, a battery capacity per battery capacity can be sufficiently increased, and excellent battery characteristics such as thermal stability and high output can be obtained. Meanwhile, when the average particle size D50 is 2 μm or less, the particles are likely to aggregate when the coating layer 2 is applied, which is not preferable.

(Spread of Particle Size Distribution)

[(d90−d10)/volume average particle size Mv], which is an index indicating spread of particle size distribution of the lithium-nickel composite oxide particles 1, is not particularly limited, but may be 0.7 or less, 0.6 or less, or 0.55 or less from a viewpoint of making the particle sizes uniform. When the particle sizes are relatively uniform, surfaces of the lithium-nickel composite oxide particles 1 are easily coated with the coating layer 2 uniformly, and the secondary battery can have favorable output characteristics. Note that a lower limit of [(d90−d10)/volume average particle size Mv] is not particularly limited, but is, for example, 0.3 or more. In addition, [(d90−d10)/volume average particle size Mv] may be 0.7 or more from a viewpoint of filling property, and the surfaces of the lithium-nickel composite oxide particles 1 can be coated with the coating layer 2 relatively uniformly by using a method for manufacturing a positive electrode active material described later.

Note that d10 means a particle size at which an accumulated volume is 10% of the total volume of all particles when the number of particles in each particle size is accumulated from a smaller particle size, and d90 means a particle size at which an accumulated volume is 90% of the total volume of all particles when the number of particles is accumulated similarly. d10, d90, and the volume average particle size Mv can be determined from a volume integrated value measured using a laser light diffraction scattering type particle size analyzer in a similar manner to the average particle size D50.

(Specific Surface Area)

A specific surface area of the lithium-nickel composite oxide particles 1 is not particularly limited, and may be, for example, 0.3 $m^2/g$ or more and 2.0 $m^2/g$ or less, or 0.3 $m^2/g$ or more and 1.0 $m^2/g$ or less. When the specific surface area is within the above range, output characteristics are favorable. Note that the specific surface area can be measured by a nitrogen adsorption BET method.

(2) Coating Layer

The positive electrode active material 10 includes the coating layer 2 on a surface of the lithium-nickel composite oxide particle 1. By inclusion of the coating layer 2 on the surface of the particle 1, in a secondary battery including a positive electrode containing the positive electrode active material 10, an interaction between the positive electrode active material 10 and the solid electrolyte can be suppressed.

The coating layer 2 is a composite oxide containing lithium (Li) and one or more elements selected from the group consisting of Al, Si, Ti, V, Ga, Ge, Zr, Nb, Mo, Ta, and W. Note that as a constituent element of the coating layer 2 excluding lithium (Li) and oxygen (O), one type of element or two or more types of elements may be included. The coating layer 2 may be, for example, a composite oxide formed of Li and Ti or a composite oxide formed of Li and Nb.

(Content of Constituent Elements of Coating Layer)

A coating amount by the coating layer 2 is not particularly limited, but the coating amount can be adjusted according to the specific surface area ($m^2/g$) of the lithium-nickel composite oxide particles 1 to be coated. For example, the coating layer 2 contains a constituent element (excluding Li and O) of the coating layer 2 at a ratio of preferably 30 μmol or more and 600 μmol or less, more preferably 50 μmol or more and 400 μmol or less per $m^2$ of the surface area of the lithium-nickel composite oxide particles 1.

When the content of the constituent element (excluding Li and O) of the coating layer 2 per $m^2$ of the surface area of the lithium-nickel composite oxide particles 1 is 30 μmol or more, the coating layer 2 can be uniformly disposed on the entire surfaces of the lithium-nickel composite oxide particles 1.

In addition, by forming the coating layer 2, a reaction between the lithium-nickel composite oxide particles 1 and the solid electrolyte can be suppressed, but at the same time, internal resistance of the secondary battery may increase. When the content of the constituent element (excluding Li and O) of the coating layer 2 per $m^2$ of the surface area of the lithium-nickel composite oxide particles 1 is 600 μmol or less, the coating layer 2 can be suppressed from hindering a reaction of intercalation/deintercalation of lithium with respect to the lithium-nickel composite oxide particles 1, and the internal resistance can be reduced.

A method for evaluating and calculating the content of the constituent element (excluding Li and O) of the coating layer 2 in the coating layer 2 is not particularly limited, but can be determined, for example, as follows.

First, the content of the constituent element (excluding Li and O) of the coating layer 2 in 1 g of the positive electrode active material is measured by a method such as chemical analysis. As the method of chemical analysis, measurement is performed by inductively coupled plasma (ICP) emission spectroscopy or the like.

Meanwhile, the specific surface area of the lithium-nickel composite oxide particles 1 before the lithium-nickel composite oxide particles 1 are coated with the coating layer 2 is measured by a nitrogen adsorption BET method or the like.

Next, by dividing the content of the constituent element (excluding Li and O) of the coating layer 2 in 1 g of the positive electrode active material by the specific surface area ($m^2/g$) of the lithium-nickel composite oxide particles 1, the content of the constituent element (excluding Li and O) of the coating layer 2 per $m^2$ of the surface area of the lithium-nickel composite oxide particles 1 can be determined.

Note that when the lithium-nickel composite oxide particle 1 contains the constituent element (excluding Li and O) of the coating layer 2, a difference in the content of the constituent element (excluding Li and O) of the coating layer 2 before and after coating can be used as the content of the constituent element (excluding Li and O) of the coating layer 2 used for coating.

(Average Thickness of Coating Layer)

The coating layer has an average thickness of, for example, preferably 2 nm or more and 20 nm or less, more preferably 2 nm or more and 15 nm or less, still more preferably 5 nm or more and 15 nm or less.

Note that the average thickness of the coating layer 2 can be calculated by observing the coating layer 2 with a scanning electron microscope (SEM), a transmission electron microscope (TEM), or the like, or analyzing the coating layer 2 with a spectroscope such as an energy dispersive X-ray spectrometer (EDS) or an electron energy loss spectroscopy (EELS) attached thereto, and measuring a layer uniformly formed on a surface of the lithium-nickel composite oxide particle 1. Note that when the thickness of the coating layer 2 varies depending on a measurement site, the thickness of the coating layer 2 refers to an average value when the thicknesses at a plurality of sites are measured.

(Disposition of Coating Layer)

In addition, the coating layer 2 is preferably present adjacent to a surface of the lithium-nickel composite oxide particle 1. Whether or not the coating layer 2 is present adjacent to the surface of the particle 1 can be determined by whether or not a compound containing the constituent element of the coating layer 2 is present free from the surface of the lithium-nickel composite oxide particle 1. When the coating layer 2 is present free from the surface of the lithium-nickel composite oxide particle 1, the coating layer 2 does not electrochemically contribute to a battery capacity, which causes a decrease in battery capacity per weight.

Note that a clear boundary line does not have to be present between the coating layer 2 and the surface of the lithium-nickel composite oxide particle 1. For example, when the lithium-nickel composite oxide particle 1 before coating does not contain the constituent element (excluding Li and O) of the coating layer 2, the coating layer 2 refers to a region where the constituent element (excluding Li and O) of the coating layer 2 is detected, and may include a region where both the constituent element (excluding Li and O) of the coating layer 2 and an element constituting the lithium-nickel composite oxide particle 1 are detected. In addition, when the lithium-nickel composite oxide particle 1 before coating contains the constituent element (excluding Li and O) of the coating layer 2, the coating layer 2 refers to a region (site) on a surface side of a particle constituting the positive electrode active material 10, in which the concentration of the constituent element (excluding Li and O) of the coating layer 2 is higher than that of a center of the lithium-nickel composite oxide particle 1.

In addition, the constituent element (excluding Li and O) of the coating layer 2 may be partially solid-solved from a surface to an inside of the lithium-nickel composite oxide particle. For example, a heat treatment step (S40) is performed after a coating step (S30), and the coating layer constituent element of the coating layer can be diffused into the lithium-nickel composite oxide according to conditions at this time.

For example, when Ti and/or Nb is contained in the coating layer 2, Ti and/or Nb is solid-solved from a surface to an inside of the lithium-nickel composite oxide particle 1. As a result, the coating layer 2 not only prevents the solid electrolyte and the lithium-nickel composite oxide particle 1 from coming into direct contact with each other to reduce a chance of reaction, but also reduces reactivity between a surface layer of the lithium-nickel composite oxide particle 1 and the solid electrolyte. Note that in the positive electrode active material 10, the degree of solid solution is preferably adjusted such that an effect of improving cycle characteristics can be sufficiently exhibited.

2. Method for Manufacturing Positive Electrode Active Material for all-Solid-State Lithium Ion Secondary Battery Next, a method for manufacturing a positive electrode active material for an all-solid-state lithium ion secondary battery (hereinafter, also referred to as "positive electrode active material") according to the present embodiment will be described. By using the manufacturing method of the present embodiment, the positive electrode active material 10 can be manufactured with high productivity.

Figure 2:
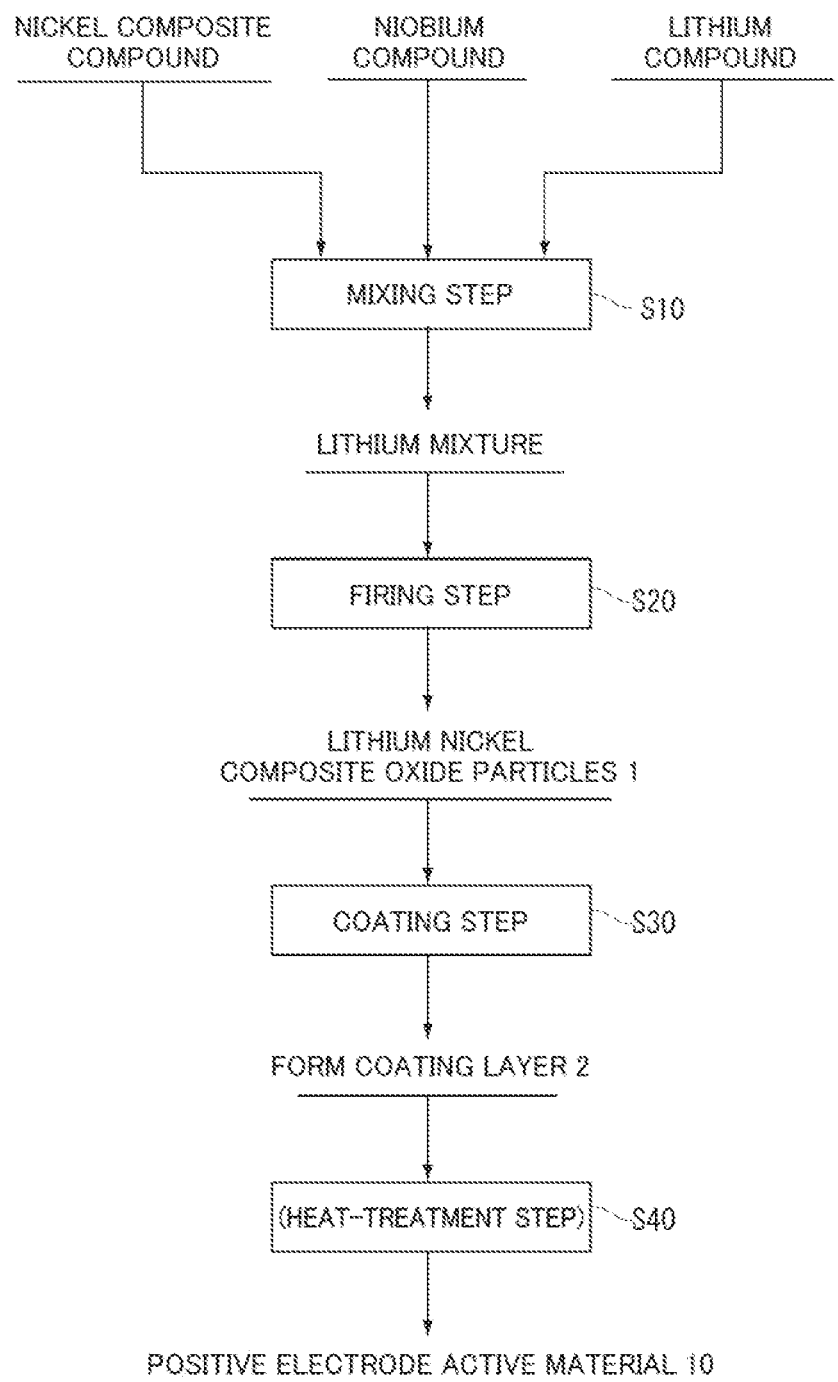
FIG. 2 is a diagram illustrating an example of a method for manufacturing the positive electrode active material according to the present embodiment.
Figure 3:
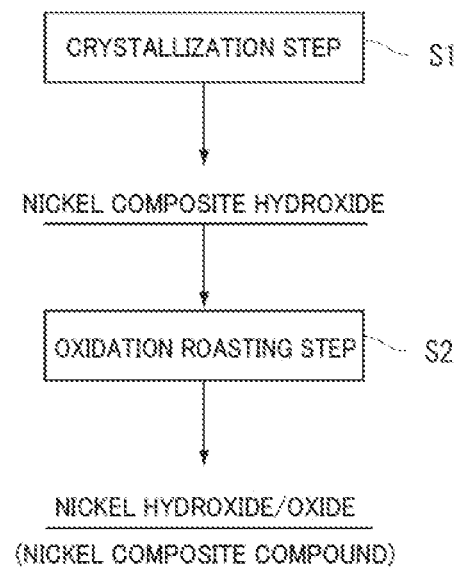
FIG. 3 is a diagram illustrating an example of a method for manufacturing a nickel composite compound according to the present embodiment.

FIGS. 2 and 3 are each a diagram illustrating an example of the method for manufacturing a positive electrode active material according to the present embodiment. As illustrated in FIG. 2, the method for manufacturing a positive electrode active material according to the present embodiment includes a mixing step (S10) of mixing a nickel composite compound, a niobium compound, and a lithium compound to obtain a mixture, a firing step (S20) of firing the mixture to obtain lithium-nickel composite oxide particles, and a coating step (S30) of attaching a coating liquid to surfaces of the lithium-nickel composite oxide particles to form a coating layer. Furthermore, after the coating step (S30), the heat treatment step (S40) of heat-treating the lithium-nickel composite oxide particles having the coating layer formed on surfaces thereof at 300° C. or higher may be included.

In addition, the nickel composite compound may be a nickel composite oxide obtained by oxidation-roasting a nickel composite hydroxide adjusted by a crystallization reaction. For example, as illustrated in FIG. 3, the nickel composite compound can be manufactured by a method including a crystallization step (S1) and an oxidation roasting step (S2. Hereinafter, each step will be described in detail. Note that the following description is an example of the manufacturing method and does not limit the manufacturing method.

(Crystallization Step: S1)

In the crystallization step (S1), a nickel composite hydroxide as a precursor of the lithium-nickel composite oxide is prepared by a crystallization reaction.

For example, a raw material aqueous solution is prepared using water-soluble compounds (metal compounds) of elements such that a molar ratio among the elements is equal to a molar ratio among elements contained in the target lithium-nickel composite oxide particle, and the prepared raw material aqueous solution, and an alkali metal aqueous solution and an ammonium ion supplier are supplied together to a reaction tank and subjected to a neutralization crystallization reaction to obtain a nickel composite hydroxide.

For example, raw materials of the elements may be simultaneously dissolved in water to manufacture a raw material aqueous solution as a mixed aqueous solution. In addition, an individual aqueous solution may be adjusted for each of the raw materials of the elements to prepare an individual raw material aqueous solution. Note that when it is inconvenient to prepare the raw material aqueous solution as a mixed aqueous solution, it is preferable to adjust the individual raw material aqueous solution for each of the raw materials. For example, when the liquid properties of the aqueous solutions of the raw materials are acidic and basic, it is preferable to adjust the individual raw material aqueous solution for each of the raw materials.

The metal compound used as a raw material of each of the elements only needs to be water-soluble, and a sulfate, a chloride, a nitrate, or the like can be used, but an inexpensive sulfate is preferable from a viewpoint of cost. Note that when a suitable water-soluble metal compound is not found for the element M or the like, the element M or the like may be added in the oxidation roasting step (S2) or the mixing step (S10) described later without being added to the mixed aqueous solution of the raw materials.

The alkali metal aqueous solution is not particularly limited, but one or more selected from the group consisting of sodium hydroxide, sodium carbonate, sodium hydrogen carbonate, potassium hydroxide, and potassium carbonate can be preferably used.

The ammonium ion supplier is not particularly limited, but one or more selected from ammonia water, an ammonium carbonate aqueous solution, an ammonium chloride aqueous solution, and an ammonium sulfate aqueous solution can be preferably used.

The shape of the reaction tank is not particularly limited, but the reaction tank is preferably a cylindrical container including a baffle plate therein and equipped with a stirrer and a temperature controller. The stirrer preferably includes a motor, a shaft, and a stirring blade. The temperature controller preferably circulates a heating medium outside the cylindrical container to heat or cool the cylindrical container.

In the neutralization crystallization reaction between the raw material aqueous solution, and the alkali metal aqueous solution and the ammonium ion supplier in the reaction tank, a pH and an ammonia concentration are preferably maintained at constant values.

The pH of the aqueous solution in the reaction tank is preferably adjusted to 11.0 or more and 12.2 or less based on a liquid temperature of 25° C. For example, when a nickel composite hydroxide is prepared, impurities derived from anions constituting the metal compound contained in the raw material aqueous solution used may be mixed into the nickel composite hydroxide. However, by setting a pH value of the initial aqueous solution (in the reaction tank) to 11.0 or more, it is possible to suppress contamination of impurities derived from anions. In addition, by setting the pH of the initial aqueous solution to 12.2 or less, it is possible to suppress micronization of the nickel composite hydroxide obtained and to obtain a composite hydroxide having a particle size suitable for a charge and discharge reaction.

The ammonia concentration of the aqueous solution in the reaction tank is preferably adjusted to 5 g/L or more and 20 g/L or less. When the ammonia concentration is 5 g/L or more, Ni in the raw material aqueous solution (mixed aqueous solution) forms an ammonium complex, and a precipitation rate decreases from a liquid phase to a solid phase as a hydroxide. Therefore, the sphericity of a particle of the nickel composite hydroxide obtained increases. Meanwhile, when the ammonia concentration is 20 g/L or less, it is possible to suppress an excessive increase in the solubility of nickel forming the ammonium complex and to more reliably set the molar ratio of the nickel composite hydroxide obtained to the target molar ratio. In addition, excessive consumption of ammonia can be suppressed, which is industrially preferable.

The atmosphere in the reaction tank is preferably a non-oxidizing atmosphere, for example, an atmosphere having an oxygen concentration of 1% by volume or less. When the atmosphere in the reaction tank is a non-oxidizing atmosphere, oxidation of the raw material compound and the like can be suppressed. For example, it is possible to prevent oxidized cobalt and manganese from being precipitated as fine particles.

The temperature in the reaction tank in the crystallization step (S1) is maintained preferably at 40° C. or higher and 60° C. or lower, more preferably at 45° C. or higher, still more preferably at 55° C. or lower.

Since the temperature in the reaction tank rises due to reaction heat or Joule heat of stirring, by setting the temperature in the reaction tank to 40° C. or higher, no extra energy is consumed for cooling. In addition, by setting the temperature in the reaction tank to 60° C. or lower, it is possible to suppress transpiration of ammonia from the initial aqueous solution and the reaction aqueous solution, and it is easy to maintain the target ammonia concentration.

The lithium-nickel composite oxide particles (powder) are preferably particles having a narrow spread of particle size distribution and a uniform particle size. In order to prepare such particles, it is necessary to obtain particles having a uniform particle size in the nickel composite hydroxide as a precursor thereof. As a method for obtaining such particles, specifically, Patent Literature 3 and the like can be exemplified.

(Oxidation Roasting Step: S2)

After the precursor crystallization step (S1), the oxidation roasting step (S2) may be performed. In the oxidation roasting step (S2), the nickel composite hydroxide obtained in the precursor crystallization step (S1) is oxidation-roasted to obtain a nickel composite oxide. In the oxidation roasting step (S2), heat treatment is performed in an oxygen-containing atmosphere, and then cooling is performed to room temperature, whereby the nickel composite oxide can be obtained.

Roasting conditions in the oxidation roasting step (S2) are not particularly limited, but for example, roasting is preferably performed at a temperature of 500° C. or higher and 700° C. or lower for one hour or more and 12 hours or less in an oxygen-containing atmosphere or in an air atmosphere. When the roasting temperature is 500° C. or higher, the nickel composite hydroxide can be completely converted into the nickel composite oxide. In addition, by setting the roasting temperature to 700° C. or lower, it is possible to suppress an excessive decrease in the specific surface area of the nickel composite oxide, which is preferable.

By setting the roasting time to one hour or more, the temperature in the firing container can be made uniform, and the reaction can proceed uniformly, which is preferable. Even when roasting is performed for a time longer than 12 hours, no significant change is observed in the obtained nickel composite oxide. Therefore, the roasting time is preferably 12 hours or less from a viewpoint of energy efficiency.

The oxygen concentration in the oxygen-containing atmosphere during roasting is preferably equal to or more than the oxygen concentration in air, that is, the oxygen concentration is preferably 20% by volume or more. Since an oxygen atmosphere can be used, an upper limit of the oxygen concentration in the oxygen-containing atmosphere can be 100% by volume.

Note that, for example, when the compound containing the element M cannot be coprecipitated in the crystallization step (S1), for example, the compound containing the element M may be added to the nickel composite hydroxide to be subjected to the oxidation roasting step S2 so as to have the same molar ratio as the target molar ratio, and firing may be performed. The compound containing the element M to be added is not particularly limited, and for example, an oxide, a hydroxide, a carbonate, or a mixture thereof can be used.

When slight sintering is observed in the nickel composite oxide obtained after completion of the oxidation roasting step (S2), a crushing treatment may be performed. Note that in the oxidation roasting step (S2), at least a part of the nickel composite hydroxide only needs to be converted into the nickel composite oxide, and the entire nickel composite hydroxide does not have to be converted into the oxide.

(Mixing Step: S10)

The mixing step (S10) is a step of mixing a nickel composite compound, a niobium compound, and a lithium compound to obtain a lithium mixture.

In the manufacturing method according to the present embodiment, a niobium compound is mixed in the mixing step (S10) to perform solid phase addition of niobium. The solid phase addition of niobium does not require a chemical solution or the like as compared with a method for coprecipitating or coating niobium in a conventionally known crystallization step, and therefore is an addition method with low environmental load and excellent productivity.

The nickel composite compound is preferably at least one of a nickel composite hydroxide and a nickel composite oxide, and more preferably a nickel composite oxide. In addition, the nickel composite compound is preferably obtained by a method including the crystallization step (S1) and the oxidation roasting step (S2) described above.

As the niobium compound, for example, niobic acid, niobium oxide, niobium nitrate, or niobium pentachloride can be used. Among these compounds, niobium hydroxide or niobium oxide is preferable from a viewpoint of easy availability and avoiding mixing of impurities into the fired lithium-nickel composite oxide.

When solid phase addition of niobium is performed, reactivity may change depending on the particle size of the niobium compound to be added. The niobium compound has a particle size (D90) corresponding to an integrated volume ratio of 90% in an integrated volume distribution curve of particle size distribution of preferably 0.1 μm or more and 20 μm or less, more preferably 0.1 μm or more and 10 μm or less, still more preferably 0.1 μm or more and 5 μm or less. When D90 of the niobium compound is less than 0.1 μm, there is a problem that handling of powder is very difficult. When D90 of the niobium compound is more than 20 μm, reactivity when firing may be reduced, diffusion of niobium into the lithium-nickel composite oxide particles may be insufficient, and thermal stability cannot be ensured in some cases. In addition, when D90 of niobium is too large, formation of the coating layer 2 may be non-uniform. Note that the particle size of the niobium compound can be appropriately adjusted within the above particle size range so as to obtain a positive electrode active material having desired characteristics.

By pulverizing a raw material niobium compound using a pulverizer such as a ball mill, a planetary ball mill, a jet mill, a bead mill, or a pin mill, D90 of the niobium compound can be adjusted within the above range. In addition, the niobium compound may be classified by a dry classifier or a sieving machine as necessary. Note that D90 of the niobium compound can be measured by a laser scattering diffraction method.

The niobium compound is mixed in an amount having a target niobium content with respect to the total number of atoms of Ni and the element M contained in the nickel composite compound. Since the content of niobium does not change before and after the firing step, a niobium compound corresponding to the amount of niobium added to the positive electrode active material is added.

The lithium compound is not particularly limited, and for example, lithium hydroxide, lithium nitrate, lithium carbonate, or a mixture thereof can be used. As the lithium compound, lithium hydroxide is preferably used from a viewpoint of low melting point and high reactivity.

For example, the lithium compound may be mixed in an amount such that the content of lithium is 95 atom % or more and 115 atom % or less, 98 atom % or more and 115 atom % or less, or 98 atom % or more and 110 atom % or less with respect to the sum (Me) of Ni, the element M, and Nb.

(Firing Step: S20)

The firing step (S20) is a step of firing the obtained lithium mixture to obtain the lithium-nickel composite oxide particles 1. Firing conditions are not particularly limited, but for example, firing is preferably performed at a temperature of 700° C. or higher and 800° C. or lower for one hour or more and 24 hours or less in an oxygen-containing atmosphere. In addition, after firing, cooling may be performed to room temperature to obtain the lithium-nickel composite oxide particles 1.

When the firing temperature is 700° C. or higher, the crystal structure of the lithium-nickel composite oxide particle 1 can be sufficiently grown. In addition, when the firing temperature is 800° C. or lower, mixing of Ni atoms into Li sites in the lithium-nickel composite oxide particles 1 to be obtained can be suppressed.

By setting the firing time to one hour or more, the temperature in the firing container can be made uniform, and the reaction can proceed uniformly, which is preferable. In addition, even when firing is performed for a time longer than 24 hours, no significant change is observed in the lithium-nickel composite oxide obtained. Therefore, the firing time is preferably 24 hours or less from a viewpoint of energy efficiency, may be 12 hours or less, may be ten hours or less, or may be six hours or less.

In addition, the oxygen-containing atmosphere is preferably an atmosphere containing 80% by volume or more of oxygen. This is because by setting the oxygen concentration in the atmosphere to 80% by volume or more, it is possible to particularly suppress mixing of Ni atoms into Li sites in the lithium-nickel composite oxide obtained, which is preferable. Since an oxygen atmosphere can be used, an upper limit of the oxygen concentration in the oxygen-containing atmosphere can be 100% by volume.

Note that when slight sintering is observed in the lithium-nickel composite oxide particles 1 obtained after the firing step (S20), a crushing treatment may be performed.

(Coating Step: S30)

The coating step (S30) is a step of attaching a coating liquid to surfaces of the obtained lithium-nickel composite oxide particles 1 to form the coating layer 2.

In the formation of the coating layer 2, for example, the lithium-nickel composite oxide particles 1 and the coating liquid are mixed and dried to form the coating layer 2 on surfaces of the lithium-nickel composite oxide particles 1. In addition, as described later, after the coating, the heat treatment step (S40) may be optionally performed in an oxygen-containing atmosphere. Hereinafter, an example of the coating step (S30) will be described.

First, a coating liquid is prepared in a predetermined amount (coating agent preparation step). The coating agent can be prepared according to the content of the constituent element (excluding Li and O) of the coating layer 2 per specific surface area ($m^2/g$) of the lithium-nickel composite oxide particles 1 obtained in the firing step (S20).

The coating liquid contains at least one element selected from the group consisting of Al, Si, Ti, V, Ga, Ge, Zr, Nb, Mo, Ta, and W. For example, the coating liquid can be prepared by dissolving a raw material compound containing the target constituent element (excluding Li and O) of the coating layer 2 in a solvent.

Examples of the raw material compound include one or more selected from the group consisting of alkoxides and chelates using a complex having a carbonyl group, a peroxy group, and the like.

The coating liquid only needs to be liquid at the time of attaching the coating liquid to surfaces of the lithium-nickel composite oxide particles 1 from a viewpoint of uniform coating. For example, the coating liquid may be prepared by dissolving a compound containing the constituent element of the coating layer 2 in a solvent such that the resulting solution is liquid at normal temperature, or may be a compound containing the constituent element of the coating layer 2 having a low melting point and dissolved by heat treatment at a low temperature.

Note that the coating liquid may contain Li, or does not have to contain Li. When the coating liquid does not contain Li, in the coating step (S30) and/or the heat treatment step (S40), Li present in the lithium-nickel composite oxide particles 1 reacts with the above compound containing the constituent element in the coating liquid, whereby the coating layer 2 can be formed.

Next, the coating liquid is attached to surfaces of the lithium-nickel composite oxide particles 1. The attachment of the coating liquid may be performed, for example, by mixing the lithium-nickel composite oxide particles 1 and the coating liquid (mixture preparation step). A general mixer can be used for mixing. In addition, drying may be performed after mixing (drying step).

In addition, the mixture preparation step and the drying step preferably proceed in parallel, and a rolling fluid coating apparatus is preferably used from a viewpoint of forming the coating layer 2 that is more uniform and has a specific thickness.

Since the coating liquid shrinks by drying, a gap is formed in the coating layer 2 formed only by performing the mixture preparation step once and the drying step once, and a function of protecting contact between the lithium-nickel composite oxide particles 1 and the solid electrolyte cannot be sufficiently exhibited in some cases. However, when the rolling fluid coating apparatus is used, the coating liquid is sprayed onto the lithium-nickel composite oxide particles 1 flowing by an air flow heated in the apparatus. Therefore, the mixture preparation step and the drying step are repeated in parallel, and a uniform coating layer having no gap is obtained, which is preferable.

In the drying step, drying is preferably performed at a temperature at which a solvent and the like of the coating agent can be sufficiently removed. For example, when a rolling fluid coating apparatus is used, an air supply temperature may be set to 80° C. or higher and lower than 300° C. After the coating treatment, additional drying may be performed by a stationary dryer separately.

The atmosphere in the drying step is not particularly limited, but in order to prevent the lithium-nickel composite oxide particles 1 from reacting with moisture in the atmosphere, air supplied from a compressor equipped with a dryer, an inert atmosphere such as nitrogen or an argon gas, or the like is preferable.

(Heat Treatment Step: S40)

Furthermore, after the coating step (S30), the heat treatment step (S40) of heat-treating the lithium-nickel composite oxide particles 1 having the coating layer 2 formed on surfaces thereof at 300° C. or higher may be included as necessary. Bonding between the coating layer 2 and the lithium-nickel composite oxide particles 1 can be further strengthened by the heat treatment step (S40).

Heat treatment conditions in the heat treatment step (S40) are not particularly limited, but the heat treatment is preferably performed at a temperature of 300° C. or higher and 600° C. or lower for one hour or more and five hours or less in an oxygen-containing atmosphere. The oxygen-containing atmosphere may be, for example, an air atmosphere.

The oxygen concentration in the oxygen-containing atmosphere in the heat treatment step (S40) is preferably equal to or higher than the oxygen concentration in the air atmosphere, that is, the oxygen concentration is preferably 20% by volume or higher. By setting the oxygen-containing atmosphere during the heat treatment to be equal to or higher than the oxygen concentration in the air atmosphere, it is possible to suppress occurrence of oxygen defects in the positive electrode active material 10 obtained. The oxygen-containing atmosphere may be an oxygen atmosphere, and an upper limit value of the oxygen concentration in the oxygen-containing atmosphere is 100% by volume.

When the heat treatment temperature is 300° C. or higher, remaining of impurities contained in the coating liquid in the positive electrode active material 10 can be further suppressed. In addition, when the heat treatment temperature is 600° C. or lower, excessive diffusion of the components of the coating layer 2 can be suppressed, and the form of the coating layer 2 can be maintained.

When the heat treatment time is one hour or more, remaining of impurities contained in the coating liquid in the positive electrode active material 10 can be further suppressed. Even when the heat treatment time is longer than five hours, no significant change is observed in the positive electrode active material 10 obtained. Therefore, the heat treatment time is preferably five hours or less from a viewpoint of energy efficiency.

After the heat treatment step (step S40), cooling is performed to room temperature to obtain, as a final product, a positive electrode active material containing the lithium-nickel composite oxide particles 1 and the coating layer 2 formed on surfaces of the lithium-nickel composite oxide particles 1.

Note that the heat treatment step (S40) does not have to be performed. That is, the steps up to the coating step (S30) may be performed to manufacture the positive electrode active material 10. This is because even when the heat treatment step (S40) is not performed, the coating layer can be uniformly and firmly formed on surfaces of the lithium-nickel composite oxide particles. Even when the heat treatment step is not performed, drying is preferably performed in order to reduce or remove a solvent, moisture, and the like of the coating agent as necessary.

When slight sintering is observed in the positive electrode active material 10 obtained after the coating step (S30) and/or the heat treatment step (S40), a crushing treatment may be further performed.

(3) All-Solid-State Lithium Ion Secondary Battery

The all-solid-state lithium ion secondary battery (hereinafter also referred to as "all-solid-state battery") according to the present embodiment includes a positive electrode, a negative electrode, and a solid electrolyte, and contains the above positive electrode active material in the positive electrode. Hereinafter, the all-solid-state battery according to the present embodiment will be described for each component.

Note that the embodiment described below is merely examples, and the all-solid-state battery can be implemented in various modified and improved forms based on knowledge of those skilled in the art including the following embodiment. In addition, an application of the all-solid-state battery is not particularly limited.

(Positive Electrode)

The positive electrode can be formed by molding a positive electrode mixture. Note that the positive electrode is appropriately treated according to a battery to be used. For example, in order to increase an electrode density, a pressure compression treatment by pressing or the like can be performed.

The above-described positive electrode mixture can be formed, for example, by mixing the above-described positive electrode active material in a powder state and a solid electrolyte.

The solid electrolyte is added in order to impart appropriate ionic conductivity to the electrode.

A material of the solid electrolyte is not particularly limited, but for example, a sulfide-based solid electrolyte such as $Li_3PS_4$, $Li_7P_3S_{11}$, or $Li_{10}GeP_2S_{12}$, an oxide-based solid electrolyte such as $Li_7La_3Zr_2O_{12}$ or $Li_{0.34}La_{0.51}TiO_{2.94}$, and a polymer-based electrolyte such as PEO can be used.

Note that a binding agent or a conductive auxiliary agent can also be added to the positive electrode mixture.

The binding agent plays a role of binding the positive electrode active material. The binding agent used in such a positive electrode mixture is not particularly limited. However, for example, one or more selected from the group consisting of polyvinylidene fluoride (PVDF), polytetrafluoroethylene (PTFE), fluororubber, ethylene propylene diene rubber, styrene butadiene, a cellulose-based resin, polyacrylic acid, and the like can be used.

The conductive material is added in order to impart appropriate conductivity to the electrode. A material of the conductive material is not particularly limited, but for example, graphite such as natural graphite, artificial graphite, or expanded graphite, and a carbon black-based material such as acetylene black or Ketjen black (registered trademark) can be used.

A mixing ratio among the substances in the positive electrode mixture is not particularly limited. For example, the content of the positive electrode active material in the positive electrode mixture can be 50 parts by mass or more and 90 parts by mass or less, and the content of the solid electrolyte can be 10 parts by mass or more and 50 parts by mass or less.

Note that the method for preparing the positive electrode is not limited to the above-described exemplified one, and another method may be adopted.

(Negative Electrode)

The negative electrode can be formed by molding a negative electrode mixture.

The negative electrode is formed by a substantially similar method to that of the positive electrode described above although components constituting the negative electrode mixture, blending thereof, and the like are different, and various treatments are performed as necessary in a similar manner to the positive electrode.

The negative electrode mixture can be prepared by mixing a negative electrode active material and a solid electrolyte. As the negative electrode active material, for example, an occluding material capable of occluding and releasing lithium ions can be adopted.

The occluding material is not particularly limited, but for example, one or more selected from the group consisting of natural graphite, artificial graphite, a fired product of an organic compound such as a phenol resin, and a powder of a carbon substance such as coke can be used. When such an occluding material is adopted as the negative electrode active material, a sulfide electrolyte such as $Li_3PS_4$ can be used as the solid electrolyte similarly to the positive electrode.

In addition, as the negative electrode active material, for example, a sheet-shaped member made of a substance containing metal lithium or a metal to be alloyed with lithium, such as indium, can be used.

(Solid Electrolyte)

The solid electrolyte is a solid having $Li^+$ ionic conductivity. As the solid electrolyte, one selected from the group consisting of a sulfide, an oxide, a polymer, and the like can be used singly or in combination of two or more types thereof.

The sulfide-based solid electrolyte is not particularly limited, and one which contains sulfur (S) and exhibits lithium ion conductivity and electronic insulation property can be used. Examples of the sulfide-based solid electrolyte include $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$.

The oxide-based solid electrolyte is not particularly limited, and one which contains oxygen (O) and exhibits lithium ion conductivity and electronic insulation property can be used.

Examples of the oxide-based solid electrolyte include lithium phosphate ($Li_3PO_4$), $Li_3PO_4NX$, $LiBO_2NX$, $LiNbO_3$, $LiTaO_3$, $Li_2SiO_3$, $Li_4SiO_4$—$Li_3PO_4$, $Li_4SiO_3$—$Li_3VO_4$, $Li_2O$—$B_2O_3$—$P_2O_5$, $Li_2O$—$SiO_2$, $Li_2O$—$B_2O_3$—$ZnO$, $Li_{1+x}Al_xTi_{2-x}(PO_4)_3$ (0≤X≤1), $Li_{1+x}Al_xGe_{2-x}(PO_4)_3$ (0≤X≤1), $LiTi_2(PO_4)_3$, $Li_3XLa_{2/3-x}TiO_3$ (0≤X≤2/3) $Li_5La_3Ta_2O_{12}$, $Li_2La_3Zr_2O_{12}$, $Li_6BaLa_2Ta_2O_{12}$, and $Li_{3.6}Si_{0.6}P_{0.4}O_4$.

Note that, as the inorganic solid electrolyte, one other than the above-described compounds may be used, and for example, $Li_3N$, $LiI$, $Li_3N—LiI—LiOH$, and the like may be used.

The polymer-based solid electrolyte is not particularly limited as long as it is a polymer compound that exhibits ionic conductivity, and for example, polyethylene oxide, polypropylene oxide, and copolymers of these can be used. In addition, the organic solid electrolyte may contain a supporting salt (lithium salt). Note that, when a solid electrolyte is used, the solid electrolyte may also be mixed in the positive electrode material in order to ensure a contact of the electrolyte with the positive electrode active material.

(Shape and Configuration of all-Solid-State Battery)

Next, examples of arrangement and configurations of members of the all-solid-state battery according to the present embodiment will be described.

The all-solid-state battery including the above positive electrode, negative electrode, and solid electrolyte can be formed into various shapes such as a coin shape and a stacked shape. In any shape, the positive electrode and the negative electrode can be stacked with the solid electrolyte interposed therebetween. Then, a positive electrode collector and a positive electrode terminal connected to the outside are connected to each other using a current collecting lead or the like, and a negative electrode collector and a negative electrode terminal connected to the outside are connected to each other using a current collecting lead or the like. The resulting product is sealed in a battery case to form an all-solid-state battery.

(Characteristics of all-Solid-State Battery)

The all-solid-state battery according to an embodiment of the present invention using the above-described positive electrode active material exhibits a high capacity.

Figure 4:
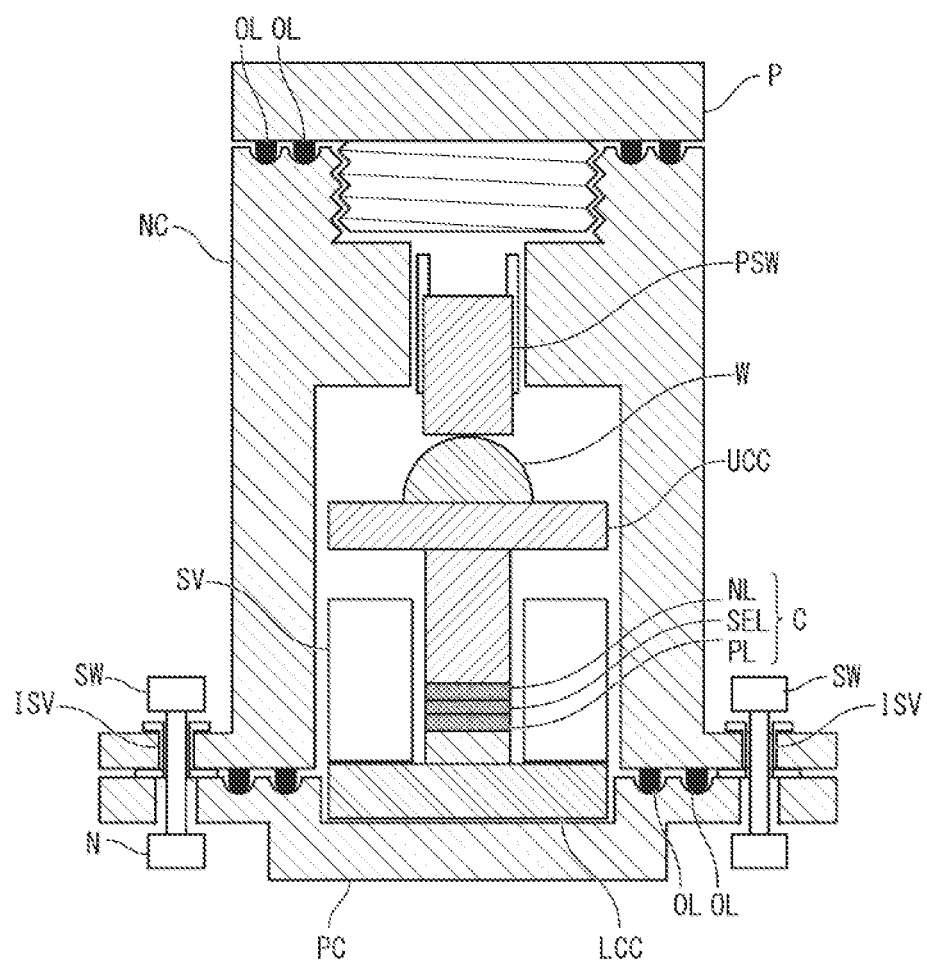
FIG. 4 is an explanatory diagram of a cross sectional configuration of an evaluation battery used for battery evaluation.

Specifically, a test battery illustrated in FIG. 4 is formed using the positive electrode active material of the present embodiment for a positive electrode, and an initial discharge capacity, which is a discharge capacity when the battery is charged to a cutoff voltage of 4.3 V (vs. Li) at a current density of 0.2 $mA/cm^2$, and discharged to a cutoff voltage of 2.5 V (vs. Li) after a pause of one hour, is preferably 130 mAh/g or more.

EXAMPLES

Hereinafter, the present invention will be described in detail with reference to Examples and Comparative Examples.

Example 1

1. Manufacture of Lithium-Nickel Composite Oxide

A lithium-nickel composite oxide was manufactured through the following steps.

(a) Crystallization Step

Into a reaction tank having an internal volume of 60 L, 10 L of pure water was put, and the temperature in the tank was maintained at 50° C. while the pure water was stirred. The inside of the reaction tank at this time was a nitrogen atmosphere having an oxygen concentration of 1% by volume or less.

Into this reaction tank, appropriate amounts of a 25% by mass sodium hydroxide aqueous solution and 25% by mass ammonia water were added to prepare an initial aqueous solution such that a pH value based on a liquid temperature of 25° C. was 12.8 and an ammonia concentration in the reaction tank was 15 g/L.

At the same time, nickel sulfate and cobalt sulfate were dissolved in pure water such that a molar ratio between nickel and cobalt was Ni:Co=0.84:0.16 to prepare 25 L of a 2.0 mol/L nickel cobalt mixed aqueous solution. In addition, 5 L of a 0.37 mol/L aluminum sulfate aqueous solution was prepared.

66 mL of the nickel cobalt mixed aqueous solution was added dropwise to the initial aqueous solution in the reaction tank at 109 mL/min to obtain a reaction aqueous solution. At this time, the 25% by mass ammonia water and the 25% by mass sodium hydroxide aqueous solution were also added dropwise to the initial aqueous solution at a constant rate, and control was performed such that the pH value of the reaction aqueous solution based on a liquid temperature of 25° C. was maintained at 12.8.

Subsequently, sulfuric acid was added dropwise into the reaction tank, and the pH of the reaction aqueous solution was adjusted to 11.5. This operation is intended to lower the pH to lower a rate at which the composite hydroxide of Ni, Co, and Al precipitates from a liquid phase to a solid phase in the subsequent precursor crystallization step, thereby improving uniformity of the particle size distribution to be obtained and sphericity of the particles.

After the pH control, 26.2 L of the nickel cobalt mixed aqueous solution was added dropwise to the reaction aqueous solution in the reaction tank at 109.2 mL/min, and at the same time, 5.9 L of the aluminum sulfate aqueous solution was added dropwise thereto at 24.8 mL/min. At this time, the 25% by mass ammonia water and the 25% by mass sodium hydroxide aqueous solution were also added dropwise to the initial aqueous solution at a constant rate, and control was performed such that the pH value of the reaction aqueous solution based on a liquid temperature of 25° C. was maintained at 11.5 and the ammonia concentration was maintained at 15 g/L.

The entire amounts of the nickel cobalt mixed aqueous solution and the aluminum sulfate aqueous solution were added dropwise, and then the pH of the reaction aqueous solution in the reaction tank was improved until the pH reached 13.0 based on a liquid temperature of 25° C. This operation is intended to precipitate nickel ions, which are ammonia-complexed and dissolved in the liquid phase, on the hydroxide to obtain a target chemical composition.

Thereafter, the reaction aqueous solution was subjected to solid-liquid separation by a Buechner funnel, a filtration can, and a vacuum pump vacuum filter. Furthermore, an operation of dispersing the obtained solid phase in 20 L of pure water at 40° C. and performing solid-liquid separation was repeated two times to remove water-soluble impurities such as sodium sulfate from the nickel composite hydroxide.

The washed cake-like solid phase after the solid-liquid separation was dried using a stationary dryer at 120° C. for 24 hours in an air atmosphere, and then sieved with a sieve having a mesh size of 100 μm to obtain a powdery nickel composite hydroxide.

(b) Oxidation Roasting Step

The prepared composite hydroxide was fired at 600° C. for two hours in an air atmosphere having an oxygen concentration of 20% by volume using an atmosphere firing furnace (BM-50100M manufactured by Siliconit Corporation), and then cooled to room temperature to obtain a nickel composite oxide.

(c) Mixing Step

To the nickel composite oxide, niobic acid ($Nb_2O_5 \cdot xH_2O$) powder manufactured by Mitsuwa Chemicals Co., Ltd. was added such that the molar amount of Nb was 0.1% with respect to the total molar amount of Ni, Co, and Al contained in the nickel composite oxide, and lithium hydroxide monohydrate weighed such that the molar amount of Li with respect to the total molar amount of Ni, Co, Al, and Nb was 103% was added thereto and mixed using a Turbula shaker-mixer (T2F manufactured by Dalton Co., Ltd.) to obtain a lithium mixture.

(d) Firing Step

The obtained lithium mixture was fired at 750° C. for five hours in an oxygen-containing atmosphere having an oxygen concentration of 90% by volume or more using an atmosphere firing furnace (BM-50100M manufactured by Siliconit Corporation), and then cooled to room temperature. Lithium-nickel composite oxide particle were thereby obtained.

2. Evaluation of Lithium-Nickel Composite Oxide Particles

The obtained lithium-nickel composite oxide was evaluated as follows.

(a) Composition

By analysis using an ICP emission spectrophotometer (725ES manufactured by VARIAN), it was confirmed that a molar ratio among Li, Ni, Co, Al, and Nb in the lithium-nickel composite oxide was Li:Ni:Co:Al:Nb=1.04:0.815:0.150:0.034:0.001.

(b) Crystal Structure

When the crystal structure of the lithium-nickel composite oxide particle was measured using XRD (manufactured by PANALYTICAL, X'Pert, PROMRD), it was confirmed that the crystal structure was a layered rock salt type crystal structure in which a peak attributed to the R-3 m structure was detected in a diffraction pattern.

In addition, a full width at half maximum of a peak attributed to a (003) plane in the diffraction pattern was measured, and the crystallite size was calculated using a Scherrer method. As a result, the crystallite size was confirmed to be 123.4 nm.

(c) Measurement of Eluted Lithium Ion Amount

The eluted lithium ion amount in the lithium-nickel composite oxide was determined by a titration method. 2.0 g of the lithium-nickel composite oxide was dispersed in 125 ml of pure water, and 2 mL of a 10% barium chloride solution was further added thereto. Neutralization titration was performed with 1 mol/L hydrochloric acid under stirring, and the amount of 1 mol/L hydrochloric acid required to reach an inflection point around pH 4 in the obtained titration curve was converted as the amount of Li derived from the eluted lithium ions. As a result, the eluted lithium ion amount in the lithium-nickel composite oxide was 0.31 wt %.

(d) Specific Surface Area

The BET specific surface area of the lithium-nickel composite oxide was measured using a fully automatic BET specific surface area measuring apparatus (Macsorb manufactured by Mountech Co., Ltd.), and confirmed to be 0.49 $m^2/g$.

(e) Particle Size Distribution

The particle size distribution of the lithium-nickel composite oxide was measured using a laser diffraction/scattering particle size distribution measuring apparatus (Microtrac HRA manufactured by Nikkiso Co., Ltd.). From the results, it was confirmed that the volume-based average particle size D50 was 5.4 μm, and a particle size distribution width ((D90−D10)/MV) calculated from D10, D90, and MV was 0.44.

3. Coating of Lithium-Nickel Composite Oxide

The following coating step was performed on the obtained lithium-nickel composite oxide.

To a solution obtained by adding 30 ml of isopropyl alcohol (IPA) and 1.8 g of titanium tetrabutoxide (Ti-BuOH) and stirring the resulting mixture, a solution obtained by adding 20 ml of IPA and 0.9 g of acetylacetone was added dropwise at 60° C. under heating and stirring. This is intended not to add acetylacetone having a high concentration directly to the Ti solution. Thereafter, a solution obtained by adding 0.54 g of pure water to 10 ml of IPA was added to the above-described solution that had been cooled. Finally, 65 ml of IPA was added to the obtained solution to adjust a coating liquid.

Using the above coating liquid, coating treatment was performed on 500 g of the lithium-nickel composite oxide by a rolling fluid coating apparatus (MP-01, Powrex).

500 g of the lithium-nickel composite oxide was caused to flow into a chamber with air heated to 120° C. and having a flow rate of 0.3 $m^3/h$, and the coating liquid was sprayed onto the lithium-nickel composite oxide at 1.7 $m^1/min$.

After the entire amount of the coating liquid was sprayed, the lithium-nickel composite oxide was collected from the inside of the chamber, and heat-treated at 400° C. for ten hours in an oxygen flow using an atmosphere firing furnace (BM-50100M manufactured by Siliconit). Thereafter, cooling was performed to room temperature to obtain lithium-nickel composite oxide particles (positive electrode active material) having a coating layer (containing Li and Ti).

4. Evaluation of Lithium-Nickel Composite Oxide Particle Having Coating Layer (a) Composition By analysis using an ICP emission spectrophotometer (725ES manufactured by VARIAN), it was confirmed that the coated lithium-nickel composite oxide contained 0.88 wt % of Ti, and the amount of Ti per unit area of a base material was 370 $\mu mol/m^2$.

(b) Thickness of Coating Layer

As a result of observing the coated lithium-nickel composite oxide sliced with a Cryo ion slicer (JEOL, IB-09060CIS) with a TEM (JEM-ARM200F manufactured by JEOL Ltd.), it was confirmed that the coating layer had a thickness of 11 nm.

5. Preparation of all-Solid-State Secondary Battery

For evaluation of a capacity of the obtained positive electrode active material, a battery (hereinafter, referred to as "test battery") having a structure illustrated in FIG. 4 was used.

(Configuration of Test Battery)

As illustrated in FIG. 4, a test battery SBA includes a case including a negative electrode can NC and a positive electrode can PC, and a green compact cell C housed in the case.

The case includes the hollow negative electrode can NC having one open end, and the positive electrode can PC disposed in the opening of the negative electrode can NC. A space for housing the green compact cell C is formed between the positive electrode can PC and the negative electrode can NC. The positive electrode can PC is fixed to the negative electrode can NC with, for example, a thumb-screw SW. The negative electrode can NC includes a negative electrode terminal, and the positive electrode can PC includes a positive electrode terminal. The case has an insulating sleeve ISV. The negative electrode can NC and the positive electrode can PC are fixed by the insulating sleeve ISV so as to maintain a non-contact state therebetween.

A pressure screw PSW is disposed at one closed end of the negative electrode can NC. After the negative electrode can PC is fixed to the negative electrode can NC, the pressure screw PSW is tightened toward the housing space of the green compact cell C, thereby holding the green compact cell C in a pressurized state through a hemispherical washer W. A screw type plug P is disposed at the end of the negative electrode can NC where the pressure screw PSW is present. O-rings OL are disposed between the negative electrode can NC and the positive electrode can PC, and between the negative electrode can NC and the plug P. The O-rings seal a gap between the negative electrode can NC and the positive electrode can PC, and maintain airtightness in the case.

The green compact cell C is a pellet having a positive electrode layer PL, a solid electrolyte layer SEL, and a negative electrode layer NL stacked in this order. The positive electrode layer PL is in contact with an inner surface of the positive electrode can PC via a lower current collector LCC. The negative electrode layer NL is in contact with an inner surface of the negative electrode can NC via an upper current collector UCC, the hemispherical washer W, and the pressure screw PSW. The lower current collector LCC, the green compact cell C, and the upper current collector UCC are protected by sleeves SV such that the positive electrode layer PL and the negative electrode layer NL are not in electrical contact with each other.

(Preparation of Evaluation Battery)

The test battery SBA was prepared as follows.

First, 80 mg of the synthesized solid electrolyte was pressurized at 25 MPa by a pelleting machine to obtain a 10 mmφ solid electrolyte pellet. Next, 70 mg of the positive electrode active material and 30 mg of the solid electrolyte were mixed in a mortar. The solid electrolyte pellet and 15 mg of the mixture of the positive electrode active material and the solid electrolyte were set in a pelleting machine, and pressurized at 360 MPa to form a positive electrode layer on the solid electrolyte pellet. A lower current collector LCC, the pellet with the positive electrode layer PL disposed downward, an indium (In) foil (negative electrode layer NL), and an upper current collector UCC were stacked in this order from the bottom, and pressurized at 9 kN to form an electrode (green compact cell C). The electrode (green compact cell C) was sealed in a case, and a pressure screw was tightened at a torque of 6 to 7 Nm. The test battery SBA was prepared in a glove box in an Ar atmosphere with a dew point controlled at −80° C.

6. Evaluation of all-Solid-State Secondary Battery

A charge and discharge capacity indicating performance of the prepared test battery was evaluated as follows.

(a) Initial Discharge Capacity

An initial discharge capacity was evaluated by measuring a discharge capacity (initial discharge capacity) when a test battery using an indium foil as a negative electrode was manufactured, left standing for about 24 hours, charged to a cutoff voltage of 3.7 V (vs. Li—In) with a current density of 0.2 mA/cm$^2$ with respect to a positive electrode after an open circuit voltage (OCV) was stabilized, and discharged to a cutoff voltage of 1.9 V (vs. Li—In) after a pause of one hour. A measurement result was 134 mAh/g.

Example 2

A coated lithium-nickel composite oxide was synthesized under the same conditions as in Example 1 except that the amount of Nb added in the lithium-nickel composite oxide synthesis step of Example 1 was changed to 0.8%. Manufacturing conditions are presented in Table 1, and results are presented in Table 2.

Example 3

A coated lithium-nickel composite oxide was synthesized under the same conditions as in Example 1 except that the amount of Nb added in the lithium-nickel composite oxide synthesis step of Example 1 was changed to 1.2%. Manufacturing conditions are presented in Table 1, and results are presented in Table 2.

Example 4

A coated lithium-nickel composite oxide was synthesized under the same conditions as in Example 1 except that the amount of Nb added in the lithium-nickel composite oxide synthesis step of Example 1 was changed to 3%. Manufacturing conditions are presented in Table 1, and results are presented in Table 2.

Example 5

A coated lithium-nickel composite oxide was synthesized under the same conditions as in Example 2 except that the firing time in the lithium-nickel composite oxide synthesis step of Example 2 was changed to 12 hours. Manufacturing conditions are presented in Table 1, and results are presented in Table 2.

Example 6

A coated lithium-nickel composite oxide was synthesized under the same conditions as in Example 3 except that the firing time in the lithium-nickel composite oxide synthesis step of Example 3 was changed to 12 hours. Manufacturing conditions are presented in Table 1, and results are presented in Table 2.

Example 7

A coated lithium-nickel composite oxide was synthesized under the same conditions as in Example 2 except that the lithium-nickel composite oxide obtained in Example 2 was coated with lithium niobate in the coating step and heat treatment was performed under the following conditions. Manufacturing conditions are presented in Table 1, and results are presented in Table 2.

After the entire amount of the coating liquid was sprayed, the lithium-nickel composite oxide was collected from the inside of the chamber, and heat-treated under an air pressure at 350° C. for one hour using an atmosphere firing furnace (BM-50100M manufactured by Siliconit). Thereafter, cooling was performed to room temperature to obtain lithium-nickel composite oxide particles (positive electrode active material) having a coating layer (containing Li and Nb).

Example 8

A coated lithium-nickel composite oxide was synthesized under the same conditions as in Example 6 except that the ratio a of Li in the lithium-nickel composite oxide synthesis step of Example 6 was changed to 1.00. Manufacturing conditions are presented in Table 1, and results are presented in Table 2.

Example 9

A coated lithium-nickel composite oxide was synthesized under the same conditions as in Example 6 except that the ratio a of Li in the lithium-nickel composite oxide synthesis step of Example 6 was changed to 1.09. Manufacturing conditions are presented in Table 1, and results are presented in Table 2.

Example 10

A coated lithium-nickel composite oxide was synthesized under the same conditions as in Example 6 except that the ratio $(1-x-y)$ of Ni was changed to 0.85 and the ratio $(x^1)$ of Co was changed to 0.116 in the lithium-nickel composite oxide synthesis step of Example 6. Manufacturing conditions are presented in Table 1, and results are presented in Table 2.

Example 11

A coated lithium-nickel composite oxide was synthesized under the same conditions as in Example 6 except that the ratio $(1-x-y)$ of Ni was changed to 0.744 and the ratio $(x^1)$ of Co was changed to 0.222 in the lithium-nickel composite oxide synthesis step of Example 6. Manufacturing conditions are presented in Table 1, and results are presented in Table 2.

Comparative Example 1

A coated lithium-nickel composite oxide was synthesized under the same conditions as in Example 1 except that Nb was not added in the lithium-nickel composite oxide synthesis step of Example 1. Manufacturing conditions are presented in Table 1, and results are presented in Table 2.

Comparative Example 2

A coated lithium-nickel composite oxide was synthesized under the same conditions as in Comparative Example 1 except that the firing temperature in the lithium-nickel composite oxide synthesis step of Comparative Example 1 was changed to 735° C. Manufacturing conditions are presented in Table 1, and results are presented in Table 2.

Comparative Example 3

A coated lithium-nickel composite oxide was synthesized under the same conditions as in Example 1 except that the amount of Nb added in the lithium-nickel composite oxide synthesis step of Example 1 was changed to 5 atom %. Manufacturing conditions are presented in Table 1, and results are presented in Table 2.

Comparative Example 4

A coated lithium-nickel composite oxide was synthesized under the same conditions as in Example 2 except that the lithium-nickel composite oxide particles in Example 2 were not coated. Manufacturing conditions are presented in Table 1, and results are presented in Table 2.

Comparative Example 5

A coated lithium-nickel composite oxide was synthesized under the same conditions as in Example 6 except that the ratio a of Li in the lithium-nickel composite oxide synthesis step of Example 6 was changed to 1.18. Manufacturing conditions are presented in Table 1, and results are presented in Table 2.

TABLE 1

| | Manufacturing conditions | | | | |
|---|---|---|---|---|---|
| | Amount of Nb added (at. %) | Method for adding Nb | Firing time (h) | Firing temperature (° C.) | Coating step |
| Example 1 | 0.1 | Solid phase addition | 5 | 750 | Presence |
| Example 2 | 0.8 | Solid phase addition | 5 | 750 | Presence |
| Example 3 | 1.2 | Solid phase addition | 5 | 750 | Presence |
| Example 4 | 3.0 | Solid phase addition | 5 | 750 | Presence |
| Example 5 | 0.8 | Solid phase addition | 12 | 750 | Presence |
| Example 6 | 1.2 | Solid phase addition | 12 | 750 | Presence |
| Example 7 | 0.8 | Solid phase addition | 5 | 750 | Presence |
| Example 8 | 1.2 | Solid phase addition | 12 | 750 | Presence |
| Example 9 | 1.2 | Solid phase addition | 12 | 750 | Presence |
| Example 10 | 1.2 | Solid phase addition | 12 | 750 | Presence |
| Example 11 | 1.2 | Solid phase addition | 12 | 750 | Presence |
| Comparative Example 1 | — | — | 5 | 750 | Presence |
| Comparative Example 2 | — | — | 5 | 735 | Presence |
| Comparative Example 3 | 5.0 | Solid phase addition | 5 | 750 | Presence |
| Comparative Example 4 | 0.8 | Solid phase addition | 5 | 750 | Absence |
| Comparative Example 5 | 1.2 | Solid phase addition | 12 | 750 | Presence |

TABLE 2

| | Lithium-nickel composite oxide particles | | | | | | | | | | Presence or absence of coating layer | Battery characteristics Discharge capacity (mAh/g) |
|---|---|---|---|---|---|---|---|---|---|---|---|---|
| | Li a | Ni 1 − x − y | Co (M) $x^1$ | Al (M) $x^2$ | Nb y | Crystallite diameter (nm) | Eluted lithium ion amount (wt. %) | Specific surface area (m²/g) | Average particle size (d50) (μm) | Variation | | |
| Example 1 | 1.04 | 0.815 | 0.150 | 0.034 | 0.001 | 123.4 | 0.31 | 0.49 | 5.3 | 0.44 | Presence | 134 |
| Example 2 | 1.04 | 0.809 | 0.149 | 0.034 | 0.008 | 109.5 | 0.36 | 0.51 | 5.4 | 0.44 | Presence | 137 |
| Example 3 | 1.04 | 0.806 | 0.148 | 0.034 | 0.012 | 82.8 | 0.50 | 0.54 | 5.2 | 0.41 | Presence | 133 |
| Example 4 | 1.04 | 0.791 | 0.145 | 0.033 | 0.030 | 45.7 | 0.69 | 0.48 | 5.2 | 0.41 | Presence | 128 |
| Example 5 | 1.04 | 0.809 | 0.149 | 0.034 | 0.008 | 107.7 | 0.38 | 0.54 | 5.2 | 0.42 | Presence | 137 |

TABLE 2-continued

| | Lithium-nickel composite oxide particles | | | | | | | | | | Presence or absence of coating layer | Battery characteristics Dischargse capacity (mAh/g) |
|---|---|---|---|---|---|---|---|---|---|---|---|---|
| | Li a | Ni $1-x-y$ | Co (M) $x^1$ | Al (M) $x^2$ | Nb y | Crystallite diameter (nm) | Eluted lithium ion amount (wt. %) | Specific surface area (m$^2$/g) | Average particle size (d50) (μm) | Variation | | |
| Example 6 | 1.04 | 0.806 | 0.148 | 0.034 | 0.012 | 76.6 | 0.58 | 0.53 | 5.2 | 0.41 | Presence | 132 |
| Example 7 | 1.04 | 0.809 | 0.149 | 0.034 | 0.008 | 107.3 | 0.34 | 0.52 | 5.4 | 0.44 | Presence | 136 |
| Example 8 | 1.00 | 0.s806 | 0.148 | 0.034 | 0.012 | 75.2 | 0.40 | 0.52 | 5.2 | 0.41 | Presence | 134 |
| Example 9 | 1.09 | 0.806 | 0.148 | 0.034 | 0.012 | 80.4 | 0.65 | 0.55 | 5.5 | 0.44 | Presence | 136 |
| Example 10 | 1.04 | 0.850 | 0.116 | 0.034 | 0.012 | 77.1 | 0.59 | 0.53 | 5.3 | 0.42 | Presence | 137 |
| Example 11 | 1.04 | 0.744 | 0.222 | 0.034 | 0.012 | 75.2 | 0.58 | 0.52 | 5.3 | 0.43 | Presence | 129 |
| Comparative Example 1 | 1.04 | 0.816 | 0.150 | 0.034 | 0 | 175.1 | 0.19 | 0.53 | 5.5 | 0.47 | Presence | 122 |
| Comparative Example 2 | 1.04 | 0.816 | 0.150 | 0.034 | 0 | 143.2 | 0.23 | 0.53 | 5.1 | 0.43 | Presence | 112 |
| Comparative Example 3 | 1.04 | 0.775 | 0.142 | 0.032 | 0.050 | 42.3 | 1.12 | 0.48 | 5.2 | 0.41 | Presence | 111 |
| Comparative Example 4 | 1.04 | 0.809 | 0.149 | 0.034 | 0.008 | 109.5 | 0.36 | 0.51 | 5.4 | 0.44 | Absence | 125 |
| Comparative Example 5 | 1.18 | 0.806 | 0.148 | 0.034 | 0.012 | 82.3 | 1.03 | 0.56 | 5.6 | 0.45 | Presence | 126 |

[Evaluation Results]

In the positive electrode active material of each of Examples, the discharge capacity in the all-solid-state battery was remarkably improved as compared with that of the positive electrode active material of Comparative Example 1 containing no Nb. In particular, in Example 2 (Nb: 0.8 atom %), the discharge capacity was remarkably improved. In addition, in the positive electrode active materials of Examples 1 and 2 in which the firing time is five hours and the positive electrode active materials of Examples 4 and 5 in which the firing time is 12 hours, characteristics of the positive electrode active materials such as a crystallite diameter and a specific surface area and battery characteristics (initial discharge capacity) are at about the same level. This indicates that a positive electrode active material having high battery characteristics can be obtained even when the firing time is five hours. In addition, it is indicated that Example 7 in which the coating layer contains Nb also has a high discharge capacity like Examples 1 to 6 in each of which the coating layer contains Ti.

In addition, it is indicated that Example 8 in which the ratio (a) of Li is 1.00 and Example 9 in which the ratio (a) of Li is 1.09 also have high discharge capacities equivalent to Example 6 (a:1.04). In addition, from Example 10 (ratio of Ni:0.850) and Example 11 (ratio of Ni:0.744) in which the ratio of Ni (1-x-y) is different from that in Example 6 (ratio of Ni:0.806), it is apparent that the discharge capacity increases as the ratio of Ni is higher.

Meanwhile, in the positive electrode active material of Comparative Example 2 containing no Nb as in Comparative Example 1, the discharge capacity was not improved and conversely decreased even when the firing temperature (735° C.) was changed.

In addition, in the positive electrode active material of Comparative Example 3 in which the amount of Nb added was more than 3 atom %, the discharge capacity in the all-solid-state battery was reduced even as compared with Comparative Examples 1 and 2 in which Nb was not added.

In addition, in the positive electrode active material of Comparative Example 4 manufactured under similar conditions to those in Example 1 except that the positive electrode active material had no coating layer, the discharge capacity in the all-solid-state battery was very low. It is considered that this is because there was no coating layer on surfaces of the lithium-nickel composite oxide particles, and therefore the resistance increased at an interface between the positive electrode active material and the solid electrolyte. In Comparative Example 5 (a: 1.18) in which the ratio (a) of Li was too high, the eluted lithium amount was large, and the discharge capacity was reduced.

INDUSTRIAL APPLICABILITY

According to the present invention, it is possible to provide a positive electrode active material that can be suitably used for a positive electrode of an all-solid-state lithium ion secondary battery requiring a high battery capacity, and a method for manufacturing the positive electrode active material.

Note that the technical scope of the present invention is not limited to the aspects described in the above embodiment and the like. One or more of the requirements described in the above embodiment and the like may be omitted. In addition, the requirements described in the above embodiment and the like can be combined with each other appropriately. In addition, to the extent permitted by law, all the literatures cited in the above embodiment and the like are incorporated as part of the description of this text. In addition, to the extent permitted by law, the disclosure of Japanese Patent Application No. 2020-129024, which is a Japanese patent application, is incorporated as part of the description of the text.

REFERENCE SIGNS LIST

1 Lithium-nickel composite oxide particles
2 Coating layer
10 Positive electrode active material
SBA Test battery
PC Positive electrode can
NC Negative electrode can
ISV Insulating sleeve
C Green compact cell
PL Positive electrode layer
NL Negative electrode layer
SEL Solid electrolyte layer
LCC Lower current collector
UCC Upper current collector P Plug
PSW Pressure screw
W Hemispherical washer
OL O-ring
SV Sleeve
SW Screw
N Nut

The invention claimed is:

1. A positive electrode active material for an all-solid-state lithium ion secondary battery, comprising a lithium-nickel composite oxide particle and a coating layer coating a surface of the particle, wherein
the lithium-nickel composite oxide particle
has a crystal structure belonging to a space group R-3m,
contains at least Li, Ni, an element M, and Nb,
a molar ratio among the elements being represented by Li:Ni:M:Nb=a:(1-x-y):x:y
($0.98 \leq a \leq 1.15$,
$0 < x \leq 0.5$,
$0 < y \leq 0.03$,
$0 < x+y \leq 0.5$, and
the element M is at least one selected from the group consisting of Co, Al, Mn, Zr, Si, Zn, and Ti),
has a crystallite diameter of 140 nm or less as calculated by a Scherrer method from a diffraction peak attributed to a (003) plane measured by XRD, and
has an eluted lithium ion amount of 0.30% by mass or more and 1.00% by mass or less with respect to a total amount of the lithium-nickel composite oxide particles as determined by neutralization titration, and
the coating layer is a composite oxide containing Li and at least one element selected from the group consisting of Al, Si, Ti, V, Ga, Ge, Zr, Nb, Mo, Ta, and W.

2. The positive electrode active material for an all-solid-state lithium ion secondary battery according to claim 1, wherein
the lithium-nickel composite oxide particles
include a secondary particle formed by aggregation of a plurality of primary particles,
have a porous structure having a plurality of voids in which no primary particle is present in the secondary particle, and
have a specific surface area of 0.3 m²/g or more and 2.0 m²/g or less as measured by a nitrogen adsorption BET method.

3. The positive electrode active material for an all-solid-state lithium ion secondary battery according to claim 2, wherein at least a part of niobium contained in the lithium-nickel composite oxide particles is segregated at an interface between the primary particles.

4. The positive electrode active material for an all-solid-state lithium ion secondary battery according to claim 1, wherein
the lithium-nickel composite oxide particles have a particle size (D50) corresponding to an integrated volume ratio of 50% in an integrated volume distribution curve of particle size distribution of 7 μm or less.

5. The positive electrode active material for an all-solid-state lithium ion secondary battery according to claim 1, wherein
the coating layer has an average thickness of 2 nm or more and 15 nm or less.

6. A method for manufacturing the positive electrode active material for an all-solid-state lithium ion secondary battery according to claim 1, the method comprising:
mixing a nickel composite compound, a niobium compound, and a lithium compound to obtain a mixture;
firing the mixture to obtain the lithium-nickel composite oxide particles; and
forming the coating layer by attaching a coating liquid containing at least one element selected from the group consisting of Al, Si, Ti, V, Ga, Ge, Zr, Nb, Mo, Ta, and W to surfaces of the lithium-nickel composite oxide particles.

7. The method for manufacturing a positive electrode active material for an all-solid-state lithium ion secondary battery according to claim 6, wherein
the nickel composite compound contains a nickel composite oxide, and
the method further includes oxidation-roasting a nickel composite hydroxide adjusted by a crystallization reaction to obtain the nickel composite oxide.

8. The method for manufacturing a positive electrode active material for an all-solid-state lithium ion secondary battery according to claim 6, the method further comprising heat-treating the lithium-nickel composite oxide particles having the coating layer formed on surfaces of the particles at 300° C. or higher after the coating.

* * * * *